R. B. VAUGHN.
CHANGEABLE SPEED GEARING FOR HARVESTER BINDERS.
APPLICATION FILED NOV. 23, 1915.
1,189,641.  Patented July 4, 1916.
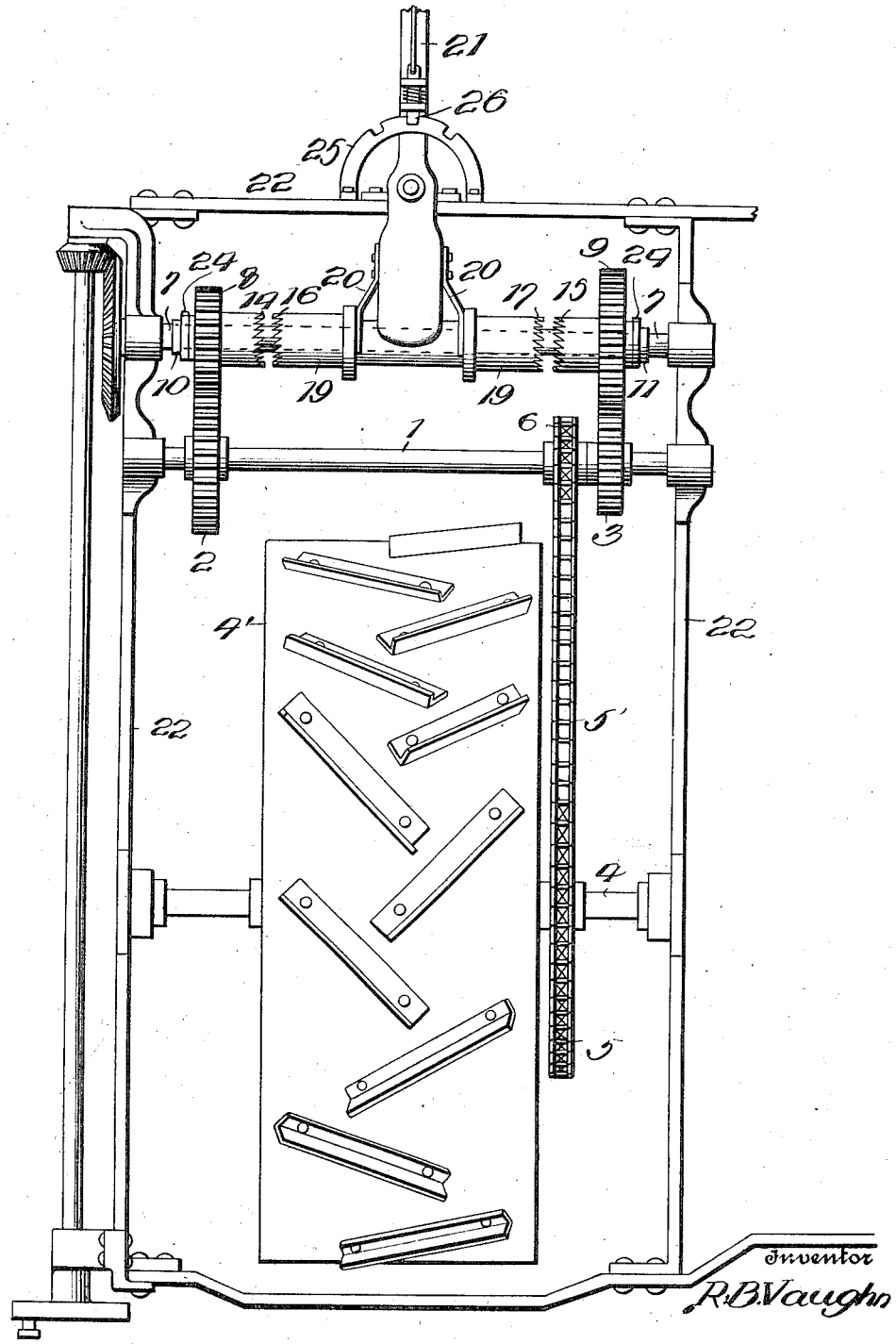

UNITED STATES PATENT OFFICE.

RUFUS B. VAUGHN, OF LA GRANGE, MISSOURI.

CHANGEABLE-SPEED GEARING FOR HARVESTER-BINDERS.

1,189,641.　　　　Specification of Letters Patent.　　Patented July 4, 1916.

Application filed November 23, 1915.　Serial No. 63,077.

*To all whom it may concern:*

Be it known that I, RUFUS B. VAUGHN, a citizen of the United States, residing at La Grange, in the county of Lewis and State of Missouri, have invented certain new and useful Improvements in Changeable-Speed Gearing for Harvester-Binders, of which the following is a specification.

This invention has relation to gearing and more particularly to the type of gearing whereby the speed may be readily changed, such gearing being specially adapted for harvester binders whereby the machinery may be run fast or slow according to the condition of the grain without requiring any change of the propelling speed by means of which the machine is driven over the ground.

In changeable speed gearing for harvester binders it is necessary that provision be made for a slipping of the gearing when the machine as a whole is reversed or moved backward. This slipping must be automatic in order to prevent injury to the working parts.

In harvester machinery it is desirable to run the mechanism fast when the grain is heavy and slow when the grain is light, thereby saving wear and power and at the same time enabling the machine to be propelled over the field at a uniform speed, and the improved device is more particularly applicable to devices of this character.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawing—the figure represents the improved device applied to a portion of a conventional grain harvester frame.

Corresponding and like parts are referred to in the following description and indicated in all the views of the drawings by the same reference characters.

The numeral 1 designates a jack shaft which, for illustration, is shown mounted upon the frame 22 of a harvester and is provided with gear wheels 2 and 3 of different diameters, the same being secured to the shaft in any manner to rotate therewith. The jack shaft 1 is adapted to receive motion from a suitable source of power as an axle 4 to which the drive wheel 4' is connected. A chain wheel 5 secured to the axle 4 is in engagement by a chain 5' with a sprocket wheel 6 fast upon the jack shaft 1. It will thus be understood that under normal conditions the jack shaft 1 is driven at a uniform speed.

A drive shaft 7 is arranged in any convenient position, for instance upon the frame 22 of the harvester, and is adapted to impart or transmit motion to the mechanism to be driven. Gear wheels 8 and 9 are loose upon the drive shaft 7 and are in mesh with the respective gear wheels 2 and 3. The gear wheels 8 and 9 are of different diameters. Sleeves 10 and 11 are secured to the drive shaft 7 and the gear wheels 8 and 9 are mounted upon the sleeves 10 and 11 so as to turn thereon and are prevented from outward displacement by set collars 24 secured to the sleeves. The hubs of the gear wheels 8 and 9 are formed at their inner ends with ratchet teeth 14 and 15 which match corresponding ratchet teeth 16 and 17 at the ends of a sleeve 19 slidably mounted upon the shaft 7 but rotatable therewith. The middle portion of the sleeve 19 is reduced and the shoulders formed at the ends of the reduced portion are engaged by means of springs 20 at the ends of a shifting lever 21 which is suitably mounted upon a portion of the framework 22. The ratchet teeth 14 and 16 constitute a clutch between the gear wheel 8 and sleeve 19. The ratchet gears 15 and 17 constitute a clutch between the gear wheel 9 and the sleeve 19. The ratchet teeth engage in one direction but slip or ratchet in the opposite direction which admits of reversing the machine or backward movement thereof without endangering the working parts or without necessitating the throwing of the mechanism out of gear. The shifting lever 21 is adapted to be held in any one of three positions by any usual means, such as a notched bar 25 and latch 26. When the sleeve 19 is moved to a neutral position, as indicated in the drawing, motion is not transmitted from the jack shaft 1 to the drive shaft 7. Movement of the lever 21 to the right or left of a neutral position throws the sleeve 19 to the left or right, thereby bringing either the gear wheel 8 or the gear wheel 9 into clutched engagement with the drive shaft 7 whereby the latter may be caused to run fast or slow. The change in the speed is effected by the difference in the diameters of the respective intermeshing gear wheels as will be readily understood.

The springs 20 constitute a yieldable connection between the clutch sleeve 19 and the shifting lever 21, hence when the lever 21 is moved to throw the clutch sleeve into engagement with either one of the gear wheels 8 or 9 any tendency of such gear wheels to rotate backward will cause the ratchet clutch teeth to ride upon the intermeshing ratchet clutch teeth of the clutch sleeve 19, thereby preventing movement being imparted to the drive shaft 7 and a rotation of the mechanism which, if permitted, would be detrimental thereto or cause injury.

Having thus described the invention, what is claimed as new is:—

In an apparatus of the class described, a main shaft, motion transmitting devices spaced apart and rotative upon said shaft and provided with clutch members, a sleeve slidable upon said shaft and partaking of its motion and having opposing clutch members, shoulders upon said sleeve and spaced apart, an operating lever extending between said stop collars, and yieldable members carried by said operating lever and in constant engagement with said stop collars.

In testimony whereof, I affix my signature.

RUFUS B. VAUGHN. [L. S.]